(12) United States Patent
Schulz et al.

(10) Patent No.: US 9,071,187 B2
(45) Date of Patent: Jun. 30, 2015

(54) METHOD AND APPARATUS FOR INCREASING A CURRENT SENSING RANGE IN A POLYPHASE MOTOR SYSTEM

(71) Applicant: GM GLOBAL TECHNOLOGY OPERATIONS LLC, Detroit, MI (US)

(72) Inventors: Steven E. Schulz, Torrance, CA (US); Milun Perisic, Cypress, CA (US); Silva Hiti, Redondo Beach, CA (US); Ronghui Li, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 69 days.

(21) Appl. No.: 14/073,377

(22) Filed: Nov. 6, 2013

(65) Prior Publication Data

US 2015/0123578 A1    May 7, 2015

(51) Int. Cl.
  *G05B 23/02*    (2006.01)
  *H02P 23/14*    (2006.01)

(52) U.S. Cl.
  CPC ..................... *H02P 23/14* (2013.01)

(58) Field of Classification Search
  CPC ...... H02P 7/2913; H02P 6/002; H02H 7/0083
  USPC ............ 318/400.01, 400.02, 400.04, 400.07, 318/400.14, 400.15, 400.21, 400.22, 318/400.32, 400.37, 400.38, 565, 700, 701, 318/721, 722, 778, 779, 798, 799, 801, 805, 318/825, 826, 430, 431, 432, 434; 388/800, 388/815, 823, 901, 909; 324/713, 117 H, 324/765.01
  See application file for complete search history.

(56) References Cited

U.S. PATENT DOCUMENTS 8,610,452 B2 *    12/2013    Lee et al. .................. 324/765.01

* cited by examiner

*Primary Examiner* — Antony M Paul
(74) *Attorney, Agent, or Firm* — Quinn Law Group, PLLC (57) ABSTRACT

A method of increasing a current sensing range for a vehicle or other polyphase motor system includes measuring phase currents delivered to a motor of the system. A controller calculates an absolute value of each phase current, compares each calculated absolute value to a saturation limit to determine whether only one sensor is saturated, and extrapolates a phase current value of the saturated sensor. The calculated temporary phase current is used as the extrapolated phase current value for the saturated sensor, and a control action is executed using the extrapolated phase current value only when the calculated temporary phase current value exceeds the measured value for the saturated sensor and a sign of the calculated temporary phase current value matches that of the measured value for the saturated sensor. A system includes the motor, a power inverter module, phase current sensors, and a controller which executes the method.

20 Claims, 6 Drawing Sheets

METHOD AND APPARATUS FOR INCREASING A CURRENT SENSING RANGE IN A POLYPHASE MOTOR SYSTEM

TECHNICAL FIELD

The present disclosure relates to a method and an apparatus for increasing a current sensing range in a polyphase motor system.

BACKGROUND

In a polyphase electric motor, three or more phase leads carry an alternating current (AC) voltage waveform at the same frequency and amplitude, but with a time offset or phase shift between the different phases. In a vehicle or other system using such a motor, an application of the AC voltage waveform to individual stator windings of the motor induces a changing magnetic field. This magnetic field causes the rotation of a rotor to occur, which in turn provides motor output torque. The motor output torque may be harnessed and directed as needed to perform useful work, e.g., propelling the vehicle.

In a vehicle transmission in particular, one or more electric traction motors may be used as part of a motor drive system, either alone or in conjunction with an internal combustion engine. Collectively, the prime movers provide input torque to the transmission. To ensure proper operation of the electric traction motor(s), a controller may conduct periodic measurements of phase currents and other electrical parameters.

SUMMARY

A vehicle is disclosed herein having a polyphase motor system, e.g., a three-phase AC electric traction motor. An accompanying method for use with such a system is also disclosed. The method extends an electrical current sensing range of individual phase current sensors within the polyphase motor system having a motor, or having multiple motors. Such sensors measure the corresponding amplitudes of the individual phase currents flowing into windings of the motor. It is recognized herein that existing motor control and diagnostic approaches may be limited due to the finite current sensing range of typical off-the-shelf phase current sensors. Thus, control and state of health motor diagnostics may not function properly at all times, or may be altogether unavailable once a given phase current exceeds the sensor measurement capability. Such a condition is referred to herein as "sensor saturation". A "saturated sensor", therefore, is a phase current sensor that reads an individual phase current having an amplitude that exceeds a predetermined saturation limit of the sensor, i.e., a calibrated limit that is specific to the particular sensor.

Under certain conditions, such as during high temperature operation, an electrical current in a given motor can exceed the measurement range of the phase current sensors used to measure the phase currents delivered to windings of the motor. As is well known in the art, demagnetization is the process by which a magnetic field diminishes over time through thermal stress, extreme changing magnetic fields, and the like. In these instances, state of health diagnostics may not detect potential demagnetization events. The present approach is therefore intended to increase the range of operation of motor state of health diagnostics while also providing an improved capability of detecting rotor demagnetization, with minimal impact on controller utilization during normal vehicle operation. Additionally, in some instances the method can be used for feedback and control purposes in the overall control of the traction motor(s).

Generally, in a three-phase system, the present method operates by continuously evaluating which one of three different phase current sensors is presently saturated. The method proceeds when only one of the sensors is saturated. The controller in such an instance extrapolates/estimates the phase current of the saturated sensor using the actual current measurements of the remaining, i.e., non-saturated, phase current sensors, and then performs specified validity checks on the extrapolated phase current to ensure that the extrapolated phase current value is within reasonable bounds, for instance to avoid false failure diagnoses during a loss of isolation. In some regions of operation, referred to below as a continuous extrapolation region, the current sensing range is extended by 15% of its saturated limit to provide useful information for feedback and control purposes.

In particular, a method of increasing a current sensing range in a system having a polyphase electric motor includes measuring, via a plurality of phase current sensors having a calibrated saturation limit, each of a plurality of phase currents delivered to the motor. The method also includes calculating, via a controller, an absolute value of each of the measured phase currents, and then comparing the calculated absolute values to the saturation limit to determine whether only one of the sensors is saturated. Additionally, the method includes extrapolating a phase current value of the one saturated sensor using the measured phase currents of the unsaturated sensors.

Extrapolating the phase current value may include calculating a temporary phase current value as a function of the phase currents of the unsaturated sensors, and determining whether an absolute value of the calculated temporary phase current exceeds the measured value for the one saturated sensor. Extrapolating may also include determining whether a sign of the calculated temporary phase current matches a sign of the measured value for the one saturated sensor, and using the calculated temporary phase current as the extrapolated phase current value for the saturated sensor. The method may include executing a control action with respect to the motor, via the controller, using the extrapolated phase current value only when the signs match and the calculated temporary phase current value exceeds the measured value for the saturated sensor.

A system is also disclosed herein that includes a three-phase electric motor, a power inverter module (PIM), the phase current sensors, and the controller noted above. The PIM supplies a first, a second, and a third phase current to respective first, second, and third phase leads of the motor. The sensors are each connected to a respective one of the phase leads, and measure a corresponding one of the phase currents.

Additionally, a vehicle includes a transmission and a polyphase motor system. The transmission includes a gear set and an output member. The polyphase motor system, which delivers motor torque to the gear set for powering the output member, includes a polyphase electric traction motor having a stator with first, second, and third phase leads. The system also includes a PIM which supplies a first, a second, and a third phase current to the first, the second, and the third phase lead, respectively.

The above features and advantages and other features and advantages of the present invention are readily apparent from the following detailed description of the best modes for carrying out the invention when taken in connection with the accompanying drawings.

DETAILED DESCRIPTION

Figure 1:
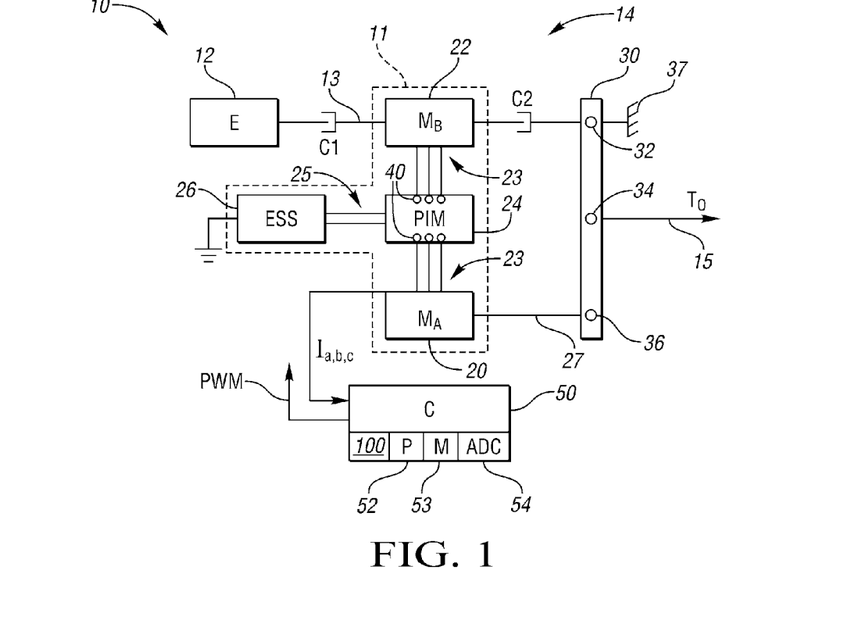
FIG. 1 is a schematic illustration of an example vehicle having at least one polyphase electric motor, a set of phase current sensors, and a controller that executes a method to increase the current sensing range of the phase current sensors.

Referring to the drawings, wherein like reference numbers correspond to like or similar components throughout the several figures, an example vehicle 10 is shown schematically in FIG. 1. The vehicle 10 includes a polyphase motor drive system 11, i.e., three or more phases, and a controller (C) 50. The controller 50 is programmed in software and equipped in hardware to execute recorded instructions embodying a method 100 for increasing an electrical current sensing range of phase current sensors 40 used within the motor drive system 11. While it is most practical to implement the following approach digitally in a microcontroller, it is also possible with discrete circuitry. For consistency, the controller 50 will be described hereinafter.

An example embodiment of the method 100 is described below with reference to FIGS. 7-8, with a description of various electrical components of the vehicle 10 provided with reference to FIGS. 2 and 3. FIGS. 3A-6C collectively describe the particular sensor saturation problem addressed by the present invention.

The vehicle 10 of FIG. 1 is shown in a non-limiting example embodiment of a hybrid vehicle having an engine (E) 12, electric traction motors 20 and 22, i.e., $M_A$ and $M_B$, respectively, and at least one gear set 30 having a set of nodes/gear elements 32, 34, and 36, e.g., a respective ring gear, sun gear, and carrier member. More or fewer traction motors may be used in other embodiments. The method 100 described herein may be applied to any polyphase motor drive system 11, whether vehicular as shown in FIG. 1 or non-vehicular. However, for illustrative consistency the vehicle 10 of FIG. 1 using the motor drive system 11 in the form of an electrical propulsion system will be described hereinafter.

In addition to the electric traction motors 20 and 22, the motor drive system 11 may include a power inverter module (PIM) 24 and a rechargeable energy storage system (ESS) 26 such as a multi-cell lithium ion or nickel metal hydride battery. The electric traction motors 20, 22 are supplied with a polyphase AC voltage (VAC), shown here as typical three-phase VAC, via an AC voltage bus 23. Direct current (DC) power from the ESS 26 is provided to the PIM 24 via a separate DC voltage bus 25. As part of the present approach, the various phase currents delivered to the electric traction motors 20, 22 are individually and separately measured via the phase current sensors 40 using the measurement process described below with reference to FIGS. 2 and 3.

The vehicle 10 of FIG. 1 further includes a transmission 14 having an input member 13 and an output member 15. The transmission 14 receives input torque from the engine 12 via the input member 13 and delivers output torque ($T_O$) to a set of drive wheels (not shown) via the output member 15. First and second friction clutches C1 and C2, respectively, may be actuated and released as needed via commands from the controller 50 or another control device of the vehicle 10 to establish a desired gear ratio, and to selectively change the mode of operation of the electric traction motors 20, 22.

In the example transmission 14 of FIG. 1, which is just one of many possible powertrain configurations, the electric traction motor 20 is continuously connected to node 36 of the gear set 30 via an interconnecting member 27. The output member 15 is continuously connected to the node 34, and node 32 is connected to a stationary member 37. The same node 32 is selectively connected to the electric traction motor 22 via clutch C2, while clutch C1 selectively connects the engine 12 to the input member 13. Other powertrain configurations may include only one electric traction motor, or more than the two electric traction motors 20 and 22 that are shown, with two or more gear sets and additional clutches used to provide the desired capabilities.

The controller 50 includes a processor (P) 52 and tangible, non-transitory memory (M) 53 on which is recorded instructions embodying the present method 100. The controller 50 may also include an analog-to-digital converter (ADC) 54. As is known in the art, an ADC such as the ADC 54 may be embodied as an electrical circuit providing a specific sampling rate which provides quantization of the continuous/analog voltage input and outputs a representative digital signal. The controller 50, which may include one or more digital computer devices, may communicate with the clutches C1, C2 of the transmission 14 and each of the electric traction motors 20, 22 via a controller area network (CAN) bus or other suitable network. The memory 53 may include read-only memory (ROM), flash memory, optical memory, additional magnetic memory, etc., as well as any required random access memory (RAM), electrically-programmable read only memory (EPROM), a high-speed clock, analog-to-digital (A/D) and/or digital-to-analog (D/A) circuitry, and any input/output circuitry or devices, as well as any appropriate signal conditioning and buffer circuitry.

The controller 50 of FIG. 1 ultimately commands, or causes the PIM 24 to generate, a set of pulse width modulation signals (arrow PWM). These PWM signals provide switching control of the input voltage used to power the electric traction motors 20 and 22. The controller 50 receives all three measured phase current signals ($I_{a,b,c}$) from the phase current sensors 40, including one phase current sensor 40 for each measured phase.

Figure 2:
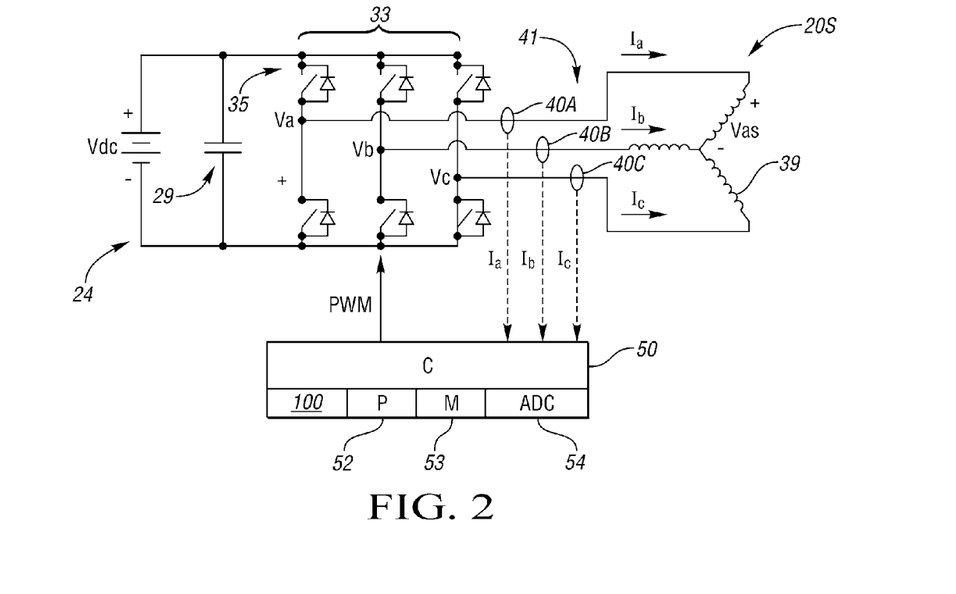
FIG. 2 is a schematic circuit diagram of some of the electrical system components of the vehicle shown in FIG. 1.
Figure 3:
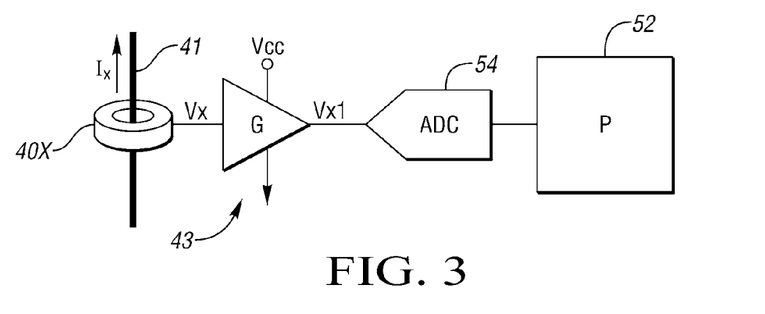
FIG. 3 is a schematic illustration of a portion of the circuit diagram shown in FIG. 2.

Referring to FIG. 2, the electric traction motor 20 ($M_A$) of FIG. 1 includes a set of stator windings 20S, shown with three individual induction coils 39. The stator windings 20S are electrically connected to the PIM 24 via a set of phase leads 41. The PIM 24 in turn is electrically connected to the ESS 26 of FIG. 1, and thus has an applied DC voltage (Vdc) as shown. A capacitor 29 may be used in electrical parallel with the applied DC voltage (Vdc) from the ESS 26 as shown. The PIM 24 also includes a current-controlled voltage source inverter 33 having a set of semiconductor dies 35, i.e., IGBTs, MOSFETs, or the like. Such semiconductor dies 35 are conventionally used as semiconductor switches in AC motor control. The PWM signals from the controller 50 activates selected ones of the semiconductor dies 35 at a particular duty cycle and switching frequency to command the required output phase voltages Va, Vb, and Vc from the PIM 24, which are delivered to the stator windings 20S via the phase leads 41.

Three-phase motor systems may require accurate sensing of each of the three applied phase currents $I_a$, $I_b$, and $I_c$. Measured phase currents can be used for various motor control, feedback, diagnostic, and monitoring purposes. In the example system of FIG. 2, three current sensors 40A, 40B, 40C are used to separately measure the phase currents flowing from the voltage source inverter 33 of the PIM 24 to a given one of the traction motors 20, 22. Typically, the phase current sensors 40 are positioned in the PIM 24 as shown, although the sensors 40 may be positioned anywhere between the PIM 24 and the motor 20 or 22 whose phase currents are being measured. Representation of the electric traction motor 22 is omitted for illustrative simplicity. The circuit diagram for any additional traction motor(s) would appear as it does for the stator 20S of the electric traction motor 20.

Additionally, the measured phase currents ($I_a$, $I_b$, $I_c$) can be used for motor control and diagnostic fault protection such as overcurrent or detection of open circuit on one or more of the phases. The measured phase current information may also be used to track thermal and other stresses applied to the motor drive system 11 of FIG. 1 in order to predict potential degradation to system components. One possible example is the monitoring for potential demagnetization of a permanent magnet (PM) motor due to excessive applied stator currents, with the accurate current information is vital to proper control, protection, and prediction of system state of health, e.g., of a rotor of the electric traction motor 20.

Sensors used in polyphase motor drive systems typically have a finite electrical current measurement range. When the physical phase current exceeds the measurement range capability of a given sensor, such as the example phase current sensors 40 shown in FIGS. 1 and 2, the phase current may be inaccurately measured, with the level of inaccuracy depending on the degree of saturation. The measured phase currents may be distorted or clipped as shown in FIGS. 5A-6C, thus resulting in values that are lower than actual measured values. This condition may result in degradation of control and/or state of health diagnostic algorithms relying on accurate phase current measurement.

One possible example diagnostic is a rotor magnet state-of-health evaluation. Such a diagnostic tracks a phase current applied to a given phase of an electric motor and determines whether sufficient stress was applied that could demagnetize the rotor magnets. In some cases, such as Neodymium magnets used in cold temperatures, a fairly large phase current is required to cause such demagnetization. The demagnetization current may be higher than the phase current sensor measurement range. Hence, if a large transient occurs such that the phase current exceeds the measurement range capability of a sensor, there would be insufficient information for determining whether or not the permanent magnets have been demagnetized. This limitation can create a blind area where demagnetization or other motor degradation may avoid detection. Therefore, an objective of the method 100 described herein is to expand the magnet state-of-health operating region to include operating conditions where one of the available phase currents exceeds the measurement range capability of the sensor used to measure it.

Referring to FIG. 3, a typical signal path is shown from an example current sensor 40X, i.e., any one of the phase current sensors 40 of FIG. 1. The phase current to be measured (arrow $I_x$) flows through the sensor 40X, e.g., an example Hall Effect sensor. The sensor voltage output ($V_x$) is filtered and scaled by interface circuitry 43 with an effective gain G (unitary or other value). The interface circuitry 43 may have limited output voltage range, for example limited between its supply rails of 0 and a reference voltage of $V_{CC}$, such as 5 V, where 2.5 V=0 A actual current and 5 V=the maximum readable current value, e.g., 100 A as in FIGS. 5A-6C. Hence, the interface circuitry 43 could present an additional source of signal clipping and distortion. The present invention is not limited to Hall effect sensors. For instance, the sensors 40 may be embodied as resistive shunts. However, even with resistive shunts the interface circuitry 43 and ADC 54 can clip the measured signal and result in error in sensed current, as explained below.

A filtered and scaled signal ($V_{X1}$) from the interface circuitry 43 is passed to the ADC 54. The ADC 54 converts the analog output from the interface circuitry 43 to a digital voltage output which can be used by the controller 50 for any control or diagnostic actions that may be required. The ADC 54 is yet another potential source of signal clipping, depending upon the reference voltage (Vcc). If the input voltage to the ADC 54 exceeds the full-scale range of the ADC 54, the signal will be clipped. The output of the ADC 54 is the digital representation of the sensed signal, and is passed to processor (P) 52. In some systems, the ADC 54 and processor 52 are integrated into a single integrated circuit. The net result is that there is a finite current measurement range, above which the input signal cannot be accurately measured. Above this range, the signal is effectively clipped.

One of the more common types of phase current sensors is the Hall Effect type noted above. A Hall Effect sensor typically employs a magnetic core along with a small integrated circuit. The magnetic core is often toroidal or rectangular shaped with a hole in the center through which an electrical current-carrying conductor, e.g., a phase lead 41, is passed. A small gap is cut in the core, into which the integrated circuit can be placed. The Hall Effect circuit outputs a voltage proportional to the current flowing thru the center of the magnetic core. The magnetic core serves to concentrate the flux surrounding the current carrying wire, as well as effectively shielding from unwanted stray fields.

While modern Hall Effect current sensors offer excellent performance, they have a finite limit on the usable operating range. The operating range, i.e., a maximum amplitude of electrical current which can be reliably and accurately measured, can be limited by several factors. For instance, the magnetic core is usually composed of ferrite or silicon steel. These materials have a limited magnetization range above which the core saturates. The sensor gain, typically specified in volts per amp of output signal, is dramatically reduced when the core saturates. Hence, the accuracy of the phase current sensor 40X of FIG. 3 may degrade, and the measured current may be effectively clipped. Another limit on the operating range is due to the supply voltage to the phase current sensor 40X. Normally, the sensor output cannot exceed its supply voltage range. Hence, at very large electrical current values, the sensor output will be limited by the supply voltage resulting in clipping of the measured current signal.

Figure 3A:
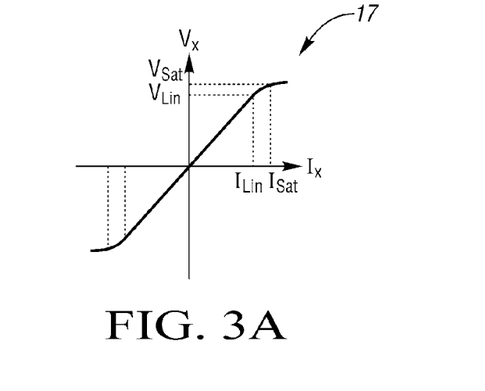
FIG. 3A is a time plot of an example transfer function illustrating saturation of one of the phase current sensors shown in FIGS. 2 and 3.

FIG. 3A shows a typical transfer input-to-output transfer function 17 of an example Hall Effect current sensor. The horizontal axis is the sensor input current ($I_X$), i.e., the total phase current passing through the phase current sensor 40X of FIG. 3. The vertical axis is the sensor output voltage ($V_X$). Up to a certain input current $I_{Lin}$, the sensor output voltage is linearly related the input current. This is referred to as the linear range of operation. As the current exceeds $I_{Lin}$, measurement accuracy will start to degrade.

A second threshold for the phase current is identified as $I_{Sat}$. Above this current level, the sensor 40X of FIG. 3 will start to saturate. At such a point, measurement accuracy may rapidly deteriorate. Saturation of the sensor output could be due to either limited supply voltage range or core saturation. In either case, the potential effect is the same: severe distortion and error in the sensed current value.

The present method 100 is intended to increase the useable current range for three phase systems employing three current sensors, i.e., phase current sensors 40A, 40B, and 40C of FIG. 2. In executing the method 100, the controller 50 of FIG. 1 assumes the electrical load is isolated with no zero sequence current paths. This is true for a typical three phase motor load. For an isolated three phase system having no zero sequence currents, the three physical phase currents will always sum to zero. In this case, the three phase currents are not independent, since any one current can be determined from the other two.

$$I_a + I_b + I_c = 0 \quad (1)$$

Recognizing this, many prior art systems employ only two physical phase current sensors 40 to reduce cost. The third phase current is then computed as the inverse sum of the two measured phases:

$$I_c = -I_a - I_b \quad (2)$$

In a two sensor system, if one of the measured phase currents exceeds the sensor measurement range, above Equation (2) can no longer be used. In this case, the feedback currents cannot be determined, as the one remaining non-saturated sensor is insufficient to determine the remaining two currents. However, it is recognized herein that in a three sensor system, if only one sensor is saturated, its phase current can be extrapolated or estimated from the two unsaturated values, for example using Equation (2) if phase c is saturated. This principle underlies the logic of method 100.

Figure 4:
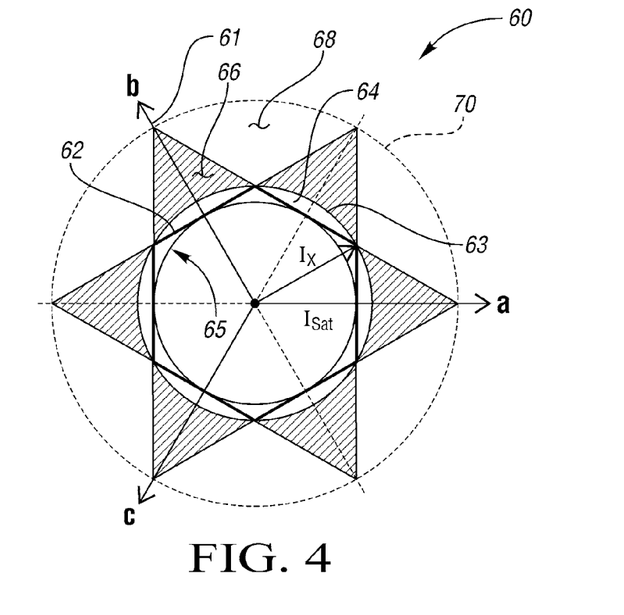
FIG. 4 is a combined vector diagram showing current sensing ranges of the phase current sensors shown in FIGS. 2 and 3.

FIG. 4 depicts a combined vector diagram 60 illustrating an example current sensing range for an example three sensor/three phase system, e.g., the motor drive system 11 of FIG. 1. Arrows 61 represent the a, b, and c phase axes. For each phase, the phase current sensors 40 of FIG. 1 have a maximum (positive) and minimum (negative) electric current that can be measured, as indicated by the current sensing hexagon formed by lines 62 orthogonal to each phase axes (both positive and negative). The current vector can be accurately measured if it lies anywhere within the hexagon defined by lines 62. If the current vector exceeds this measurement hexagon, then one or more of the measured phase currents will be distorted or clipped.

For continuous, balanced, three phase sinusoidal phase currents to a motor such as electric traction motor 20 of FIGS. 1 and 2, the stator phase current ($I_X$) is represented as a vector rotating in the plane of FIG. 4. As the amplitude of the phase currents increase, the maximum current achievable without any signal clipping is defined by circle 65. Circle 65 defines the continuous linear range of sensing. In this case, the peak phase current equals the maximum sensor range.

If the measured current amplitudes exceed the continuous linear range, then one or more of the sensed phase current values will be clipped. Assuming only one of the phase current sensors 40 is saturated, equation (2) may be used to compute the saturated phase current from the other two phase currents. As the current vector of FIG. 4 rotates, sequential phases will be saturated, and equation (2) is adjusted accordingly to compute only the saturated phase. For example, for a counterclockwise rotating vector, the phases may be computed in the following sequence:

a, c, b, a, c, b, a . . .

Above a certain current amplitude, there may be instances in which more than one phase current sensor 40 is saturated. This boundary occurs when the current vector touches the corners of the measurement hexagon, as represented by vector $I_X$ and circle 63 in FIG. 4. For this limiting condition, when the vector $I_X$ reaches each of the corners of the hexagon defined by lines 62, two phases are at the edge of sensor saturation. In fact, one phase will be increasing in amplitude and crossing the saturation limit, while another phase will be decreasing in amplitude and dropping below the saturation limit. Using geometry, the amplitude of the current vector $I_X$ when reaching this boundary condition may be determined as follows:

$$I_{Sat} = I_x \cos\frac{\pi}{6} \quad (3)$$

$$I_x = \frac{2}{\sqrt{3}} I_{Sat} = (1.155)(I_{Sat}) \quad (4)$$

Thus, if the phase current is less than or equal to 1.155 times the sensor measurement range, Equation (2) can be used to continuously compute the single saturated current sensor. For phase currents within this range, the method 100 can provide a continuous and accurate measured current for each of the three phases. Thus, motor control actions may be executed by the controller 50 using the extrapolated phase current. That is, it is desirable to have continuous current information for closed loop current control purposes, i.e., for controlling or limiting the phase currents delivered to the windings of the motor 20. Hence, the method 100 can be useful to extend the normal operating range of the motor drive system 11 of FIG. 1, such as providing additional measurement range for moderate transient conditions. The current amplitude range 1.0 to 1.155 times the sensor measurement range is referred to herein as the continuous extrapolation range 64. In this range, an example control action as executed by the controller 50 may include using the extrapolated phase current in the current control of one of the motors 20, 22 of FIG. 1. Such an approach effectively extends the sensor range by 15%.

If the phase current amplitude exceeds 1.155 times the sensor range, then there will be conditions where more than one phase current sensor 40 is saturated simultaneously. In this case, the saturated phase currents cannot be computed. If the calculation of Equation (2) is performed whenever possible, i.e., for angles where two phase current sensors 40 are not saturated, the resulting computed phase currents will be discontinuous. Such a result is generally not suitable for closed loop motor current control purposes, unlike in the continuous extrapolation region noted above. However, for some functions such as motor state of health diagnostics, it can be useful to have extended current measurement range, even if the resultant current waveform is not continuous.

The limiting case occurs when the peak phase current amplitude reaches 2× (200% of) the sensor measurement range. At this condition, when one phase current peaks, the other two phases will have equal and opposite sign or direction. For example, if $I_a=2*I_{sat}$, then $I_b=I_c=-I_{sat}$. Here, $I_a$ can still be computed from $I_b$ and $I_c$. For this angle, the current sensing range is effectively doubled. Again, the resulting computed phase current will be discontinuous since the extrapolation can only be performed when one sensor 40 is saturated. If more than one sensor 40 is saturated, such as within regions 68, extrapolation is not performed as noted below. The current amplitude range from 1.155 to 2 times the sensor measurement range is represented as the discontinuous extrapolation range 66. In this region, the controller 50 of FIG. 1 can still perform control actions, although these control actions are limited to state of health and other diagnostics due to the discontinuous nature of the results.

Once the current amplitude exceeds 2× the current sensor range, which would fall outside the circle 70, extrapolation cannot be performed. This is because only one phase current sensor 40 is non-saturated. The discontinuous extrapolation range 66 only extends the sensor range for a portion of the entire angular range. As the amplitude of the current increases, the angle for possible extrapolation decreases. At the boundary between continuous and discontinuous extrapolation regions, the measurement range can be extended at all current vector angles (0 to 360 degrees). At the upper boundary of the discontinuous extrapolation region (200% of or 2× the continuous linear range), the current can only be extended at the phase axes (either positive or negative), e.g., 0, 60, 120 degrees, etc. However, for state-of-health purposes, the peak current applied to the system is relevant, and it is possible to extract this valuable information even from the discontinuous waveform. Therefore, execution of the method 100 effectively enlarges the circle 63 outward as far as the boundary encompassed by circle 70, thereby providing useful information about the phase current sensor 40 that can be used in various state of health and other diagnostic actions.

Figure 5A:
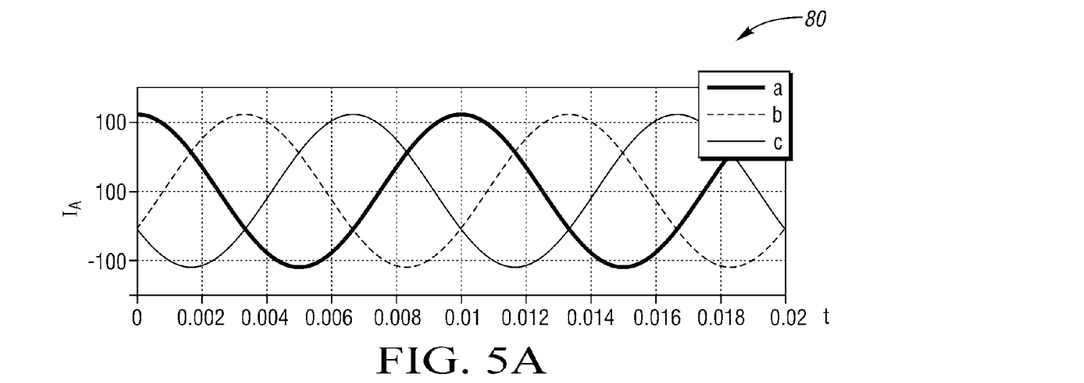
FIGS. 5A-C are schematic time plots depicting a saturated set of signals and a continuous extrapolation range, with amplitude plotted on the vertical axis and time plotted on the horizontal axis.
Figure 5B:
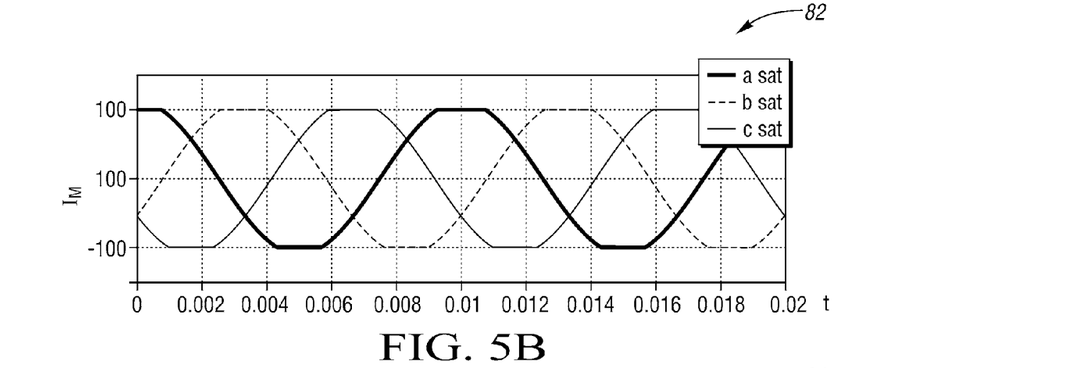
Figure 5C:
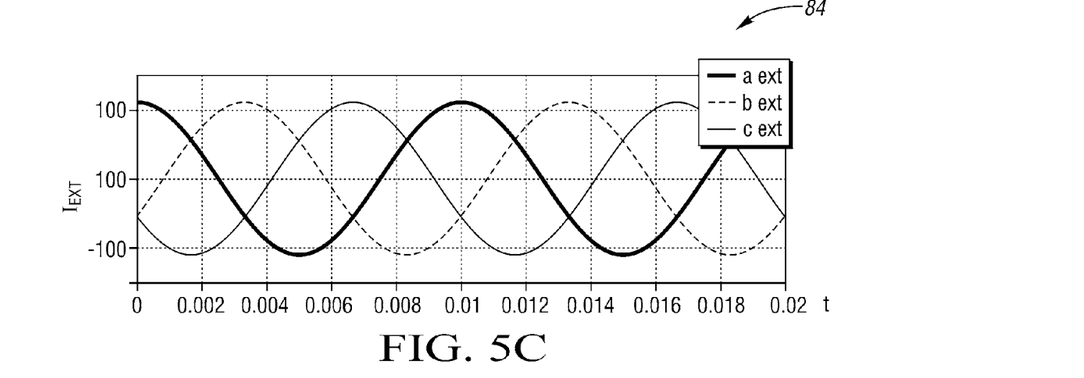

The vector diagram 60 of FIG. 4 may be explained in greater detail with reference to the illustrative time plots of FIGS. 5A-C, with time plotted on the horizontal axis and actual current amplitude ($I_A$) plotted on the vertical axis. FIG. 5A shows waveforms 80, which show an example set of phase currents at 1.1× of sensor range for an example 100 A range. Waveform 82 shows how the measured amplitude ($I_M$) is clipped at the limit 100 A, which is the limit of the phase current sensor 40 in this example. Waveform 84 shows the extrapolated currents ($I_{ext}$) for the continuous extrapolation range 64 of FIG. 4. Note that no data is lost in this region, i.e., waveform 80 is fully reconstructed as waveform 84.

Figure 6A:
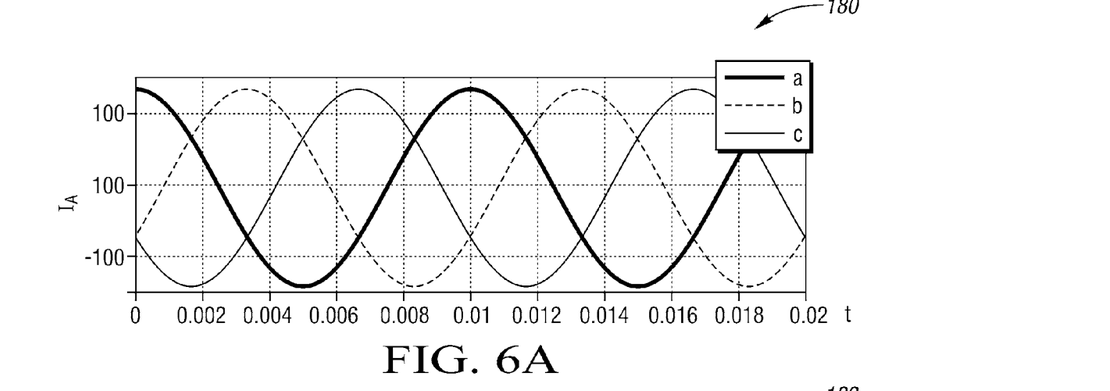
FIGS. 6A-C are schematic time plots depicting a saturated set of signals and a discontinuous extrapolation range, with amplitude plotted on the vertical axis and time plotted on the horizontal axis.
Figure 6B:
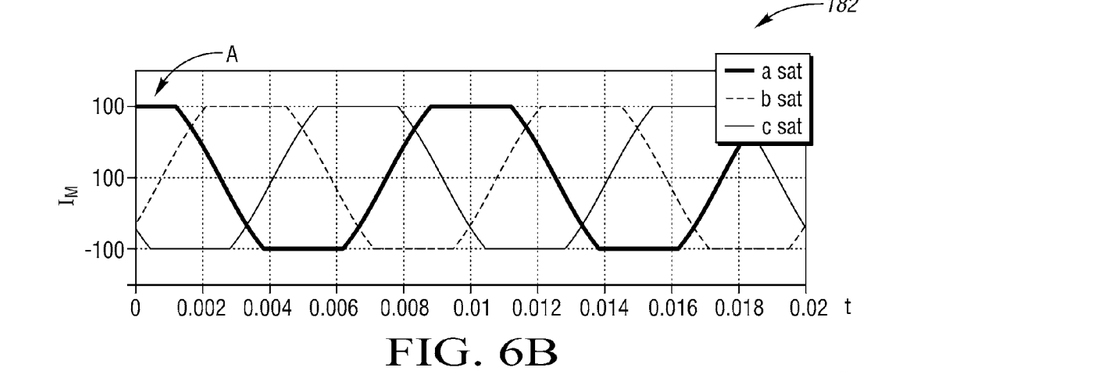
Figure 6C:
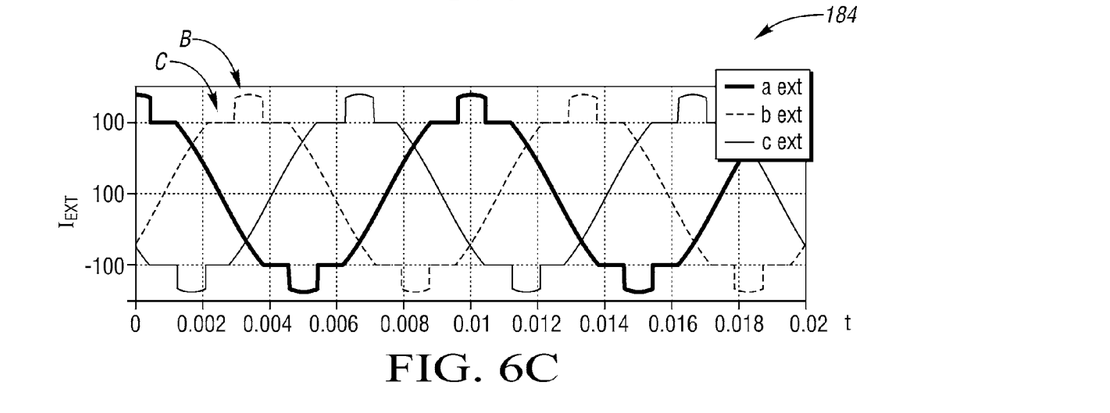

FIGS. 6A-6C shows waveforms 180, 182, and 184, respectively. In this example, waveform 180 shows a peak phase current of 1.4× of the sensor range. The sensor 40, as with FIGS. 5A-C, is saturated at 100 A, and thus the currents are clipped, as indicated by arrow A. Waveform 184 shows the extrapolated currents ($I_{ext}$) for the discontinuous extrapolation range 66 of FIG. 4. Note that unlike in FIGS. 5A-C, some sensory data is lost in this region when the current vector passes through regions 68. That is, waveform 180 is not completely reconstructed as waveform 184. However, the execution of the method 100 allows some data to be determined, as indicated by arrow B. Where two or more sensors 40 are saturated, the data cannot be determined, as indicated by arrow C. However, extrapolation of at least some data (arrow B) may be useful in performing the actions noted above, such as motor state of health diagnostics.

Figure 7:
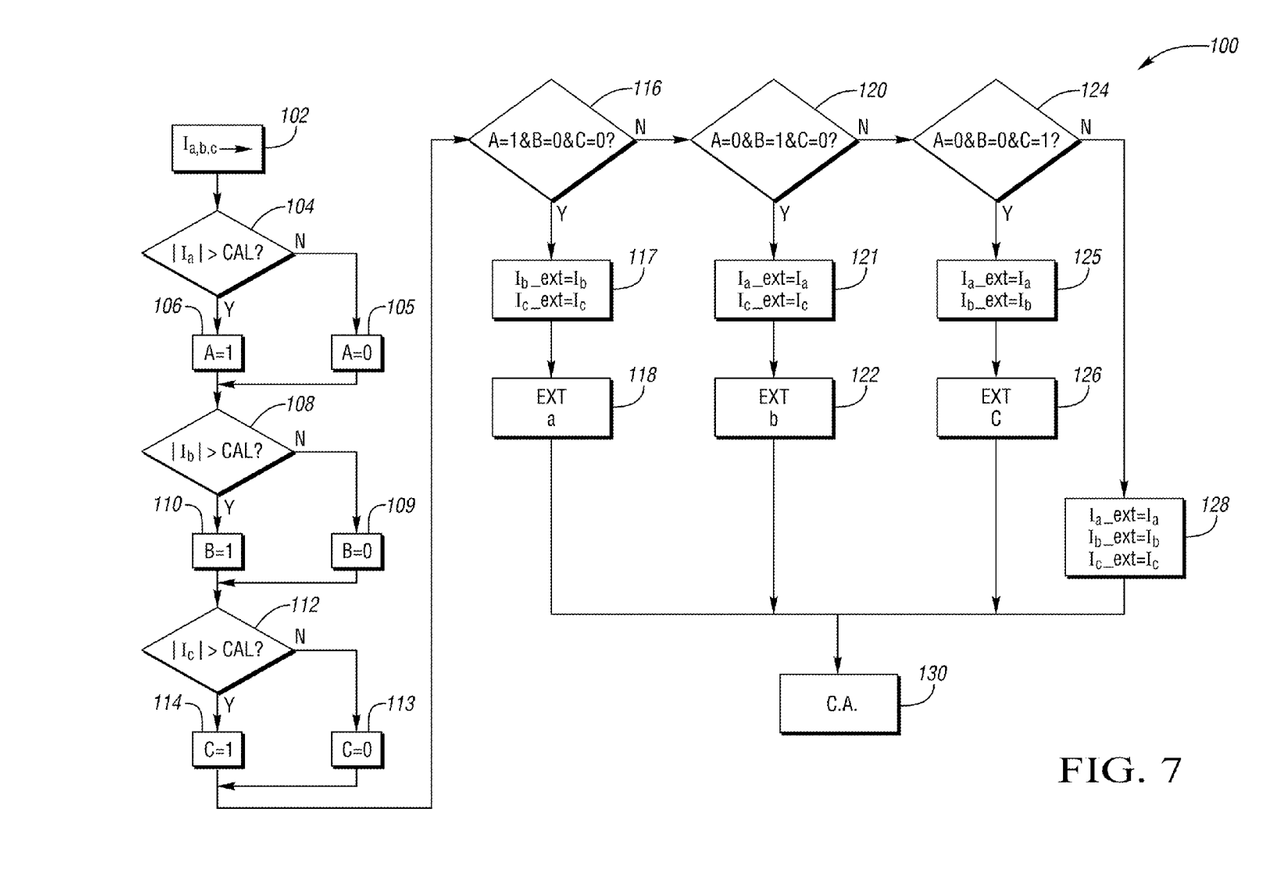
FIG. 7 is a flow chart describing an example method of increasing an electrical current sensing range in a polyphase motor system.
Figure 8:
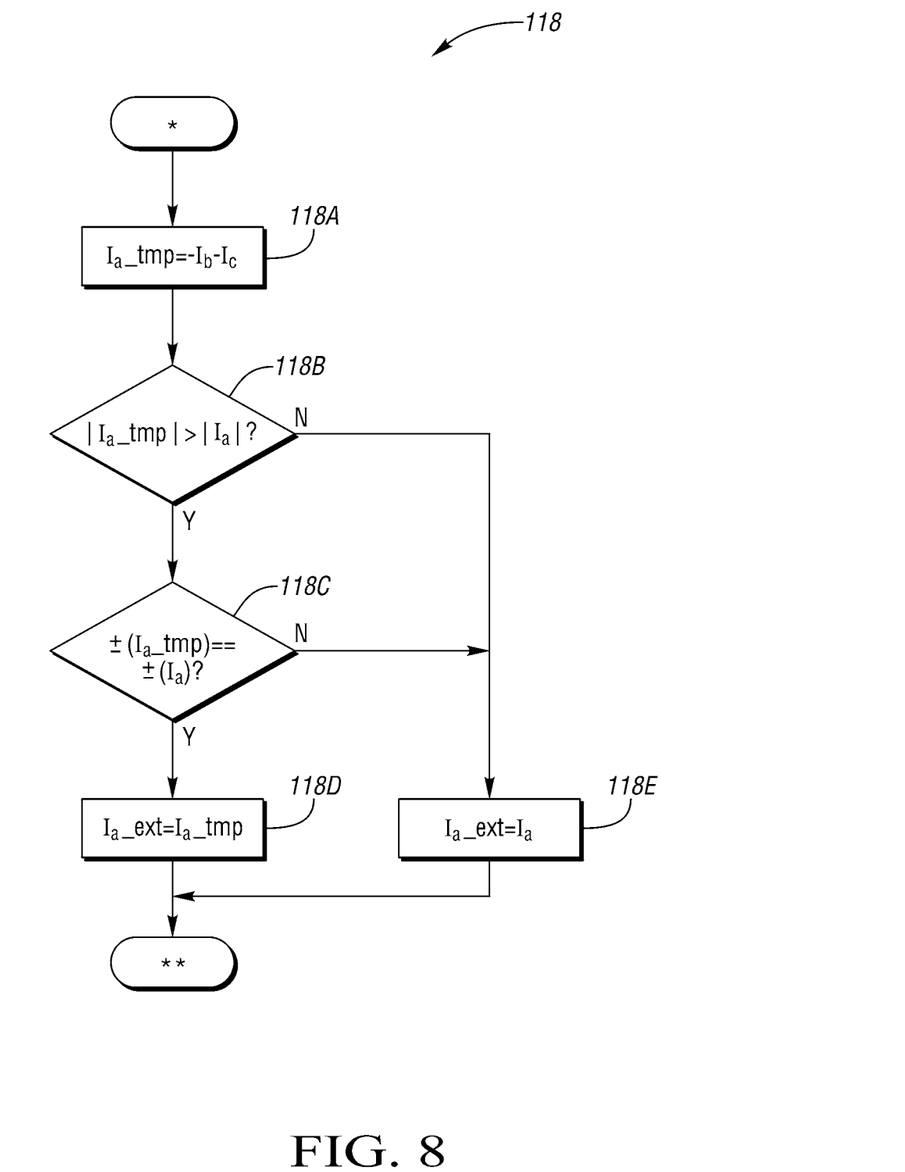
FIG. 8 is a flow chart describing an extrapolation process usable in the execution of the example method shown in FIG. 7.

Referring to FIG. 7, an example embodiment is provided for the method 100 noted above. Each of the blocks or steps of method 100 may be encoded as instructions in software and automatically executed by the processor 52 of FIG. 1. The method 100 begins at step 102, wherein the phase currents $I_{a,b,c}$ are measured by the sensor 40 and ultimately read from the ADC 54. The method 100 proceeds to step 104 once the controller 50 determines the value of the measured phase currents $I_{a,b,c}$.

Step 104 entails calculating the absolute value of the measured phase current $I_a$ from step 102 to a calibrated threshold, above which the controller 50 knows the measurement is saturated. For instance, if the linear region of the transfer function of FIG. 3A is 700 A and saturation begins at 770 A, with the signal fully clipped at 830 A, then 770 A may be set as the threshold. The particular phase current sensor 40 being used will have its own unique transfer function, and thus the calibrated limits for a given sensor will vary with the design. If the measured value exceeds the calibrated threshold, the method 100 proceeds to step 106. Otherwise, the method 100 proceeds to step 105.

Step 105 includes setting a flag (A=0) indicating that the measured value at step 102 for phase a is less than the calibrated saturation limit. The method then proceeds to step 108.

Step 106 includes setting a flag (A=1) indicating that the measured value at step 102 for phase a is above the calibrated saturation limit. The method then proceeds to step 108.

Steps 108 and 112 repeat the operation of the above-described step 104 for the other two phases, i.e., phase b and phase c, respectively. For phase b, steps 109 and 110 correspond to steps 105 and 106, respectively, while steps 113 and 114 correspond to these steps for phase c. Thus, steps 104-114 ensure that each of the three phases current amplitudes ($I_a$, $I_b$, $I_c$) are compared to a calibrated threshold value. Again, the calibrated threshold value should be selected at somewhat less than the maximum measurement range of the phase current sensor 40, e.g., the linear range of the phase current sensor 40 as shown in FIG. 3A, such that measurement accuracy is maintained. Once all three phases are checked with respect to the calibrated threshold, the method 100 proceeds to step 116.

Step 116-128 collectively describe three conditional checks which determine if one and only one of the three phase current sensors 40 of FIG. 1 is saturated. If only one sensor 40 is saturated, the saturated phase is extrapolated by the controller 50 from the other two phase currents, as described in more detail with reference to FIG. 8 and step 118. The remaining non-saturated sensors require no modification, so the extrapolated value is set to the sensed value for those phases. In the event either none of the phase current sensors 40 are saturated, or if more than one phase current sensor 40 is saturated, none of the phases are extrapolated. The extrapolated values are then set to the sensed values for all three phases.

At step 116, the method 100 next determines whether phase current $I_a$, and only phase current $I_a$, exceeds the calibration saturation limit. To do this, the controller 50 of FIG. may check the flag values from steps 105, 106, 109, 110, and 113, 114 to determine that the following condition is true: A=1, B=0, and C=0. If true, the method 100 proceeds to step 117. Otherwise, the method 100 proceeds to step 120.

Step 117 includes setting extrapolated phase currents for the two unsaturated phase currents, i.e., $I_{b\_ext}$ and $I_{c\_ext}$, equal to the values that were measured at step 102. The method 100 then proceeds to step 118 to extrapolate the value for phase A.

Step 118 includes extrapolating the phase current $I_a$. Referring briefly to FIG. 8, this Figure describes an example method for performing step 118. The same process may be performed for the other phases in steps 122 and 126, and therefore these steps can be performed according to the process of step 118.

In step 118A, the controller 50 of FIG. 1 calculates an amplitude of a temporary calculated value ($I_{a\_tmp}$) as a function of the measured, unsaturated values, i.e., $I_{a\_tmp}=-I_b-I_c$. At step 118B, the controller 50 compares the computed value from step 118A to the sensed value as a sanity check. The computed value should be larger than the sensed value, as the physical current should be higher than the sensed value if that particular sensor is saturated. Thus, step 118B compares the absolute value of the temporary value $I_{a\_tmp}$ to the measured current $I_a$, and proceeds to step 118C if the temporary value exceeds the measured value. Otherwise, the method 100 proceeds to step 118E.

At step 118C, the controller 50 performs another sanity check, this time of the sign of the temporary and measured currents. The method 100 proceeds to step 118D if the signs match, otherwise the method 100 proceeds to step 118E. Step 118C is used per the recognition that if a sensor 40X saturates in a positive direction (increasing amplitude), the extrapolated value should not be negative, and vice versa.

Step 118D is executed only if both of the checks of steps 118B or 118E result in a pass. In this instance, the calculated temporary value from step 118A is used as the extrapolated value. i.e., $I_{a\_ext}=I_{a\_tmp}$.

At step 118E, which is arrived at only if either of the checks of steps 118B or 118E does not result in a pass, the controller 50 disregards the temporary calculated value. No extrapolation is performed, i.e., $I_{a\_ext}=I_a$.

Referring again to FIG. 7, the method 100 may include executing a control action (C.A.) via the controller 50 of FIG. 1 using the results of steps 102-128, including either or both of controlling a function of the motor 20 and recording a diagnostic code in memory 53 of FIG. 1 indicating, for instance, a state of health of the motor 20. Step 130 may include calculating a qualitative or quantitative/numeric state of health value for the particular electric traction motor 20 or 22 of FIG. 1 whose phase currents have been evaluated. Such an action may entail comparing the measured or extrapolated phase currents to a calibrated high/low threshold and recording a passing or failing diagnostic code based on the result of this comparison. Other example approaches may include determining the d-axis component of the stator current vector, i.e., the component used to control the rotor flux linkage, from the phase current value, e.g., via Park/Clarke transformations, and then performing a state of health diagnostic of the motor 20, for instance of a rotor magnet thereof. In the continuous extrapolation region 64, the control action of step 130 may entail using the extrapolated current for feedback and control of the motor 20, such as determining whether or to what extent to limit the phase currents $I_a$, $I_b$, and $I_c$. Using this knowledge, the controller 50 can control switching or other power functions of the PIM 24 of FIG. 1 to provide the required phase currents.

While the best modes for carrying out the invention have been described in detail, those familiar with the art to which this invention relates will recognize various alternative designs and embodiments for practicing the invention within the scope of the appended claims.

The invention claimed is:

1. A method of increasing a current sensing range in a system having a polyphase motor, the method comprising:
   measuring, via a plurality of phase current sensors having a calibrated saturation limit, each of a plurality of phase currents delivered to the polyphase motor;
   calculating, via a controller, an absolute value of each of the measured phase currents;
   comparing each of the calculated absolute values to the calibrated saturation limit to determine whether only one of the phase current sensors is saturated;
   extrapolating a phase current value of the one saturated sensor using the measured phase currents of the unsaturated sensors, including:
      calculating a temporary phase current value as a function of the phase currents of the unsaturated sensors;
      determining whether an absolute value of the calculated temporary phase current exceeds the measured value for the one saturated sensor;
      determining whether a sign of the calculated temporary phase current matches a sign of the measured value for the one saturated sensor; and
      using the calculated temporary phase current as the extrapolated phase current value for the saturated sensor; and
   executing a control action of the polyphase motor, via the controller, using the extrapolated phase current value only when the signs match and the calculated temporary phase current value exceeds the measured value for the saturated sensor, including at least one of controlling a function of the polyphase motor and recording a diagnostic code indicating a state of health of the polyphase motor.

2. The method of claim 1, wherein the system includes a power inverter module (PIM), and wherein measuring each the phase currents occurs between the PIM and the polyphase motor.

3. The method of claim 1, wherein measuring the phase currents is accomplished using Hall Effect sensors.

4. The method of claim 1, wherein measuring the phase currents is accomplished using shunt resistors.

5. The method of claim 1, wherein calculating a temporary phase current value as a function of the phase currents of the unsaturated sensors includes calculating the temporary phase current in a discontinuous extrapolation range in which the current amplitude range for the saturated sensor is between 1.155× and 2× the sensor measurement range of the saturated sensor.

6. The method of claim 1, wherein calculating a temporary phase current value as a function of the unsaturated phase current includes calculating the temporary phase current in a continuous extrapolation range in which the current amplitude range for the saturated sensor is less than 1.155× the sensor measurement range of the saturated sensor.

7. A system comprising:
   a polyphase motor having first, second, and third phase leads;
   a power inverter module which supplies a first, a second, and a third phase current to the respective first, second, and third phase leads;
   a plurality of phase current sensors each connected to a respective one of the first, second, and third phase leads, and operable to measure a corresponding one of the first, second, and third phase currents; and
   a controller in communication with the plurality of phase current sensors, wherein the controller includes a processor and tangible, non-transitory memory on which is recorded instructions for increasing a current sensing range of the phase current sensors, wherein execution of the instructions by the processor causes the controller to:
      measure, via the phase current sensors, each of the plurality of phase currents;

calculate an absolute value of each of the measured phase currents;

separately compare each of the calculated absolute values to a saturation limit to determine whether only one of the sensors is saturated with respect to the saturation limit, with the remaining sensors being unsaturated sensors;

extrapolate the phase current for the one saturated sensor from the measured phase currents of the unsaturated sensors by:

calculating a temporary phase current value as a function of the phase currents of the unsaturated sensors;

determining whether the absolute value of the calculated temporary phase current exceeds the measured value of the saturated sensor;

determining whether a sign of the calculated temporary phase current value matches a sign of the measured current value of the saturated sensor; and using the calculated temporary phase current as an extrapolated phase current for the saturated sensor; and execute a control action of the polyphase motor using the extrapolated value only when the signs match and the calculated temporary phase current value exceeds the measured value of the saturated sensor, including at least one of controlling a function of the polyphase motor and recording a diagnostic code indicating a state of health of the polyphase motor.

8. The system of claim 7, wherein the polyphase motor is a synchronous permanent magnet motor.

9. The system of claim 7, wherein the polyphase motor is an asynchronous induction motor.

10. The system of claim 7, further comprising a gear set, wherein the polyphase motor includes an output shaft that is operatively connected to the gear set.

11. The system of claim 10, wherein the polyphase motor is an electric traction motor of a vehicle having a transmission with an output member, and wherein the gear set includes a first node which is connected to the output shaft of the polyphase motor and a second node which is directly connected to the output member of the transmission.

12. The system of claim 7, wherein the phase current sensors are Hall Effect sensors.

13. The system of claim 7, wherein the phase current sensors are shunt resistors.

14. The system of claim 7, wherein the controller is configured to calculate the temporary phase current value in a discontinuous extrapolation range in which the current amplitude range is between 1.155× and 2× the sensor measurement range of the identified saturated sensor, and in a continuous extrapolation range in which the current amplitude range is less than 1.155× the sensor measurement range of the identified saturated sensor.

15. A vehicle comprising:

a transmission having a gear set and an output member; and a polyphase motor system which delivers motor torque to the gear set for powering the output member, the polyphase motor system including:

a polyphase electric traction motor having a stator with a first, a second, and a third phase lead;

a power inverter module which supplies a first, a second, and a third phase current to the first, the second, and the third phase lead, respectively;

a plurality of sensors each connected to a respective one of the phase leads and operable to measure a corresponding one of the first, second, and third phase currents; and a controller in communication with the sensors, wherein the controller includes a processor and tangible, non-transitory memory on which is recorded instructions for increasing a current sensing range in the polyphase motor system, wherein execution of the instructions by the processor causes the controller to:

measure, via the plurality of phase current sensors, each of the phase currents;

calculate an absolute value of each of the measured phase currents;

separately compare each of the calculated absolute values to a calibrated threshold to thereby determine whether only one of the phase current sensors is saturated with respect to a saturation limit;

extrapolate the phase current for the saturated phase current sensor from the measured phase currents of all of the remaining phase current sensors when only one of the phase currents is saturated, by:

calculating a temporary phase current value as a function of the unsaturated phase currents;

determining whether the absolute value of the calculated temporary phase current exceeds the measured value;

determining whether a sign of the calculated temporary phase current value matches a sign of the measured current value; and using the calculated temporary phase current as an extrapolated phase current for the saturated phase current; and execute a control action of the motor using the extrapolated value only if the calculated temporary phase current value exceeds the measured value and the signs match, including at least one of controlling a function of the polyphase electric traction motor and recording a diagnostic code indicating a state of health of the polyphase electric traction motor.

16. The vehicle of claim 15, further comprising an engine and a clutch, wherein the engine is selectively connected to the motor via engagement of the clutch.

17. The vehicle of claim 15, wherein the sensors are Hall Effect sensors or shunt resistors, and are positioned between the power inverter module and the traction motor.

18. The vehicle of claim 15, wherein the controller is configured to calculate the temporary phase current value in a discontinuous extrapolation range in which the current amplitude range is between 1.155× and 2× the sensor measurement range of the identified saturated sensor, and in a continuous extrapolation range in which the current amplitude range is less than 1.155× the sensor measurement range of the identified saturated sensor.

19. The vehicle of claim 15, wherein the polyphase electric fraction motor is a synchronous permanent magnet motor.

20. The vehicle of claim 15, wherein the polyphase electric motor is an asynchronous induction motor.

* * * * *